(12) United States Patent
Vaida et al.

(10) Patent No.: US 7,453,899 B1
(45) Date of Patent: Nov. 18, 2008

(54) FIELD PROGRAMMABLE NETWORK APPLICATION SPECIFIC INTEGRATED CIRCUIT AND A METHOD OF OPERATION THEREOF

(75) Inventors: Theodore F. Vaida, Lafayette, CO (US); Peter Gasperini, San Carlos, CA (US)

(73) Assignee: LSI Corporation, Milpitas, CA (US)

( * ) Notice: Subject to any disclaimer, the term of this patent is extended or adjusted under 35 U.S.C. 154(b) by 1565 days.

(21) Appl. No.: 09/851,504

(22) Filed: May 8, 2001

(51) Int. Cl.
*H04L 12/54* (2006.01)

(52) U.S. Cl. .................................. 370/419
(58) Field of Classification Search ................. 370/400, 370/401, 419, 420; 709/201, 208, 20; 716/12–17, 716/2, 32, 36, 37, 100; 326/37; 712/32, 712/36, 37, 2, 100; 713/2, 100; 719/327
See application file for complete search history.

(56) References Cited

U.S. PATENT DOCUMENTS

| | | | |
|---|---|---|---|
| 4,969,121 A | 11/1990 | Chan et al. | |
| 6,205,509 B1* | 3/2001 | Platko et al. | 710/269 |
| 6,226,292 B1* | 5/2001 | DiPlacido | 370/395.7 |
| 6,347,347 B1* | 2/2002 | Brown et al. | 710/23 |
| 6,363,444 B1 | 3/2002 | Platko et al. | |
| 6,393,457 B1* | 5/2002 | Allison et al. | 709/201 |
| 6,701,432 B1* | 3/2004 | Deng et al. | 713/153 |
| 6,792,502 B1* | 9/2004 | Pandya et al. | 711/108 |
| 6,807,581 B1* | 10/2004 | Starr et al. | 709/250 |
| 6,920,562 B1* | 7/2005 | Kerr et al. | 713/189 |
| 6,959,316 B2* | 10/2005 | Parviainen | 708/620 |

OTHER PUBLICATIONS

A C Compiler for a Processor with a Reconfigurable Functional Unit; Proceedings of the 37th ACM/IEEE Conference on Disign Automation Conference, 2000—Author(s)—Ye et al.
Using General-Purpose Programming Languages for FPGA Design; DAC 2000—Author(s)—Hutchings et al.
Reconfigurable Computing: Its Concept and a Practical Embodiment Using Newly Developed Dynamically Reconfigurable Logic (DRL) LSI; ASP-DAC 2000—Author(s)—Masakazu Yamashina.
Reconfigurable Computing: What, Why and Implications for Design Automation; DAC 1999—Author(s)—DeHorn et al.
An Automated Temporal Partitioning and Loop Fission Approach for FPGA Based Reconfigurable Synthesis of DSP Applications: DAC 1999—Author(s)—Meenakshi Kaul.
Dynamically Reconfigurable Architecture for Image Processor Applications; DAC 1999—Author(s)—Alexandro Adario.

(Continued)

*Primary Examiner*—Wing F. Chan
*Assistant Examiner*—Duc T Duong
(74) *Attorney, Agent, or Firm*—Hitt Gains, P.C.

(57) ABSTRACT

The present invention provides a field programmable network application specific integrated circuit and a method of operation thereof. In one advantageous embodiment, the field programmable network application specific integrated circuit includes a media access controller and a programmable logic core having an array of dynamically configurable arithmetic logic units. The programmable logic core configured to interface with the media access controller and implement at least one application level function capable of generating metadata. The media access controller and the programmable logic controller form at least a portion of a MP-block.

20 Claims, 5 Drawing Sheets

OTHER PUBLICATIONS

A Representation for Dynamic Graphs in Reconfigurable Hardware and its Application to Fundamental Graph Algorithms; FPGA 2000—Author(s)—Lorenz Huelsbergen.

A Reconfigurable Multi-Function Computing Cache Architecture; DCNL Conference 2000—Author(s)—Kim et al.

Communicating Logic: An Alternative Embedded Stream Processing Paradigm; ASP-DAC 2000—Author(s)—Imlig et al.

The Application of Genetic Algorithms to the design of Reconfigurable Reasoning VLSI Chips; FPGA 2000—Author(s)—Moritoshi Yasunaga.

A Benchmark Suit for Evaluating Configurable Computing Systems—Status, Reflections, and Future Directions: FPGA 2000—Author(s)—Kumar et al.

A Scheduling and Allocation Method to Reduce Data Transfer Time by Dynamic Reconfiguration; Asia and South Pacific DAC 2000—Author(s)—Kazuhito Ito.

An Architecture-Driven Metric for Simultaneous Placement and Global Routing for FPGA's ; DAC 2000—Author(s)—Chang et al.

MorphoSys: Case Study of a Reconfigurable Computing System Targeting Multimedia Applications; DAC 2000—Author(s)—Singh et al.

LSI Logic ASICs To Add Programmable-Logic Cores; http//www.eetimes.com/story/OEG19990729S0001; EE Times; Jul. 29, 1999; 2 pages—Author(s)—Matsumoto.

* cited by examiner

FIELD PROGRAMMABLE NETWORK APPLICATION SPECIFIC INTEGRATED CIRCUIT AND A METHOD OF OPERATION THEREOF

TECHNICAL FIELD OF THE INVENTION

The present invention is directed, in general, to networking systems and, more specifically, to a field programmable network application specific and a method of operation thereof.

BACKGROUND OF THE INVENTION

Many computer systems today are used in a network configuration where each network computer can transmit data to other computers on the same network. Various systems and related protocols have been developed over the years to implement these networks, such as Token Ring, Ethernet and ATM. Depending upon which network is being used, certain requirements must be met, such as the type of hardware used and the particular data characteristics associated with that network.

The Ethernet local area network (LAN) has become one of the most popular and widely used computer networks. Since the beginnings of the Ethernet in the early 1970's, computer networking companies and engineering professionals have continually worked to improve Ethernet product versatility, reliability, and transmission speeds. To ensure that new Ethernet products were compatible and reliable, the Institute of Electrical and Electronic Engineers (IEEE) formed a working group to define and promote industry LAN standards. Today, the IEEE has various Ethernet working groups that are responsible for standardizing the development of new Ethernet protocols and products under an internationally well known LAN standard called the "IEEE 802.3 standard."

There are a wide variety of standard compliant Ethernet products used for receiving, processing and transmitting data over Ethernet networks. By way of example, these networking products are typically integrated into network supporting devices, including network computers, network interface cards (NICs), routers, switching hubs, bridges and repeaters. One particular networking product that may be included within many of the above-mentioned network supporting devices is a network interface device.

Currently, two main interface devices are employed within these network supporting devices, namely Field Programmable Gate Array (FPGA) chips and Application—Specific Integrated Circuits (ASIC) chips, each having its own benefits and drawbacks, and fighting head-to-head for an increased portion of the market share in the lower volume production market. FPGAs provide a large amount of flexibility when included as part of the network interface device. Analogous with their name, FPGAs are field programmable devices that employ programmable gates to allow various configurations and can be reprogrammed in the field. This provides the ability to determine and correct any errors which may not have been detectable prior to use. Additionally, the FPGAs may be reprogrammed to accommodate new devices connected thereto.

One of the most noticed drawbacks of an FPGA, however, is its unfavorable performance. FPGAs, as compared to other network interface devices, have been known to experience certain undesirable performance issues. While FPGAs may be reprogrammed if a performance issue or an error is detected, this is not always the best solution to the problem. For example, depending on certain circumstances, an integrated device that may not be reprogrammed may be desired over a device that may be reprogrammed. One such circumstance may be the amount latency incurred due the FPGA having to interface with other devices not within the FPGA. FPGAs also experience certain density and speed issues, as compared to other network interface devices. The speed issue may be attributed to the re-programmability nature of the FPGA's gates.

As previously stated, ASIC chips are also commonly used and implemented as part of network interface devices. ASIC chips are regarded in the industry as being very fast network interface devices, providing a high performance guarantee, as compared to FPGAs. However, ASIC chips also experience certain drawbacks. One of the main drawbacks of ASIC chips, and probably the most notable deterrent against using them more frequently, is their inability to be programmed. Because they cannot be reprogrammed, an extremely large amount of time and money must be provided at an inception of the design and manufacture thereof.

Accordingly, what is needed in the art is a network interface device that includes the benefits of prior art FPGAs and ASIC chips, however, a network interface device that does not experience their drawbacks.

SUMMARY OF THE INVENTION

To address the above-discussed deficiencies of the prior art, the present invention provides a field programmable network application specific integrated circuit and a method of operating the same. In one advantageous embodiment, the field programmable network application specific integrated circuit includes: (1) a media access controller and (2) a programmable logic core having an array of dynamically configurable arithmetic logic units. The programmable logic core is configured to interface with the media access controller and implement at least one application level function capable of generating meta-data. The media access controller and the programmable logic controller form at least a portion of a MP-block.

In another embodiment, the present invention provides a method of operating a field programmable network application specific integrated circuit that includes: (1) configuring a programmable logic core, having an array of dynamically configurable arithmetic logic units, to interface with a media access controller and implement at least one application level function capable of generating meta-data, wherein the programmable logic core and the media access controller form at least a portion of a MP-block, (2) transmitting and receiving network data employing the media access controller, and (3) processing the network data as a function of the at least one application level function.

The present invention also provides, in one embodiment, a field programmable router application specific integrated circuit that includes a plurality of MP-blocks having: (1) a media access controller that transmits and receives network data via a physical interface device and (2) a programmable logic core having an array of dynamically configurable arithmetic logic units. The programmable logic core interfaces with the media access controller and implements at least one application level function capable of generating meta-data. The field programmable router application specific integrated circuit further includes: (1) an interconnect MUX coupled to each of the plurality of MP-blocks and configured to switch the network data between ones of the plurality of MP-blocks and (2) a master subsystem configured to receive the meta-data from each of the plurality of MP-blocks and control the interconnect MUX to route the network data.

In another embodiment, the present invention provides a field programmable video phone application specific integrated circuit that includes a first, second and third MP-block having:

(1) a media access controller that transmits and receives network data via a physical interface device and (2) a programmable logic core having an array of dynamically configurable arithmetic logic units. The programmable logic core interfaces with the media access controller and implements at least one application level function capable of generating meta-data. The field programmable video phone application specific integrated circuit further includes: (1) an interconnect MUX coupled to the first, second and third MP-blocks and configured to switch the network data between the first MP-block and the second and third MP-blocks and (2) a master subsystem configured to receive the meta-data, control the interconnect MUX to route at least a portion of the network data containing audio between the first MP-block and the second MP-block, and control the interconnect MUX to route at least a portion of the network data containing video between the first MP-block and the third MP-block.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
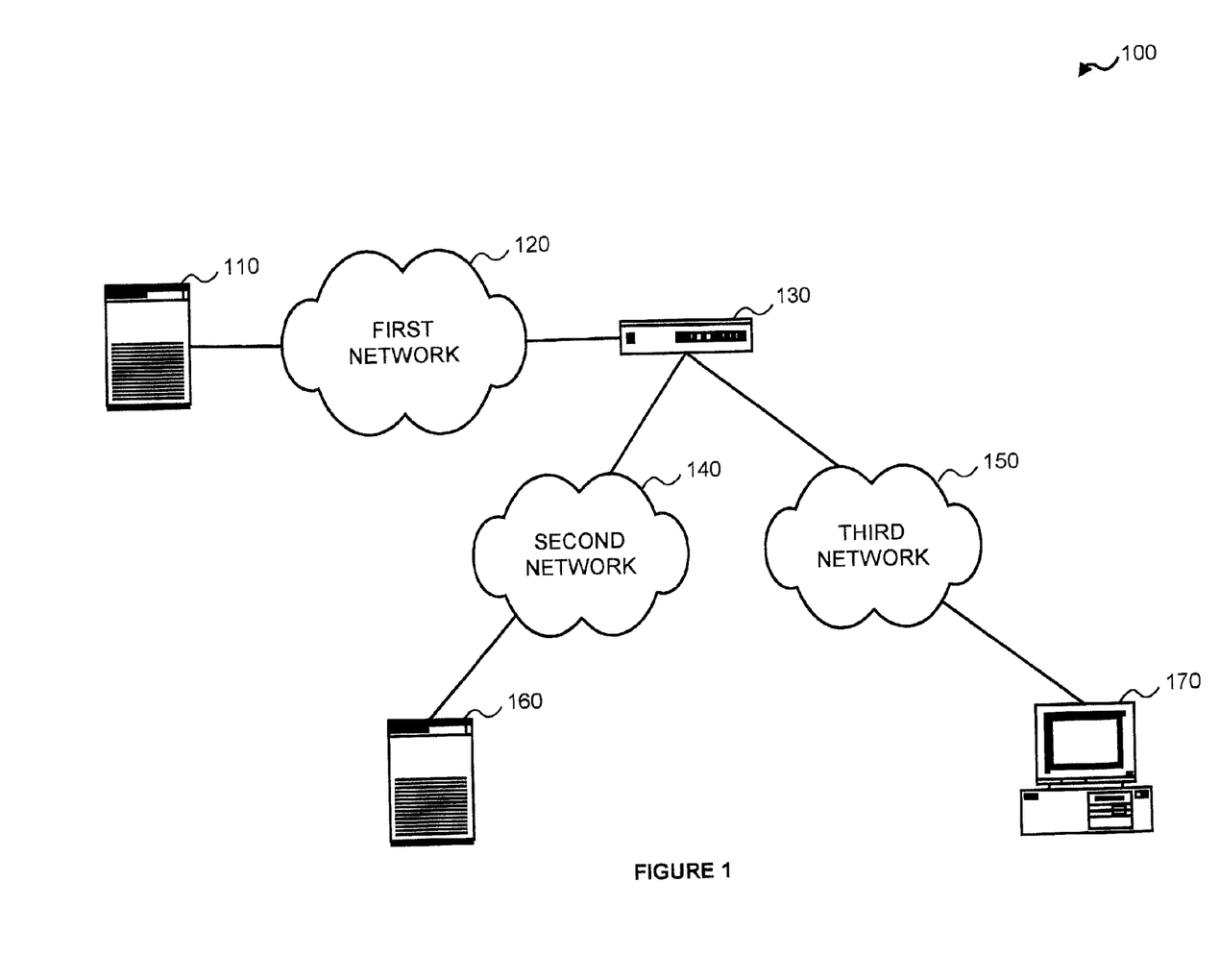
FIG. 1 illustrates a block diagram of an embodiment of a communications network employing a router constructed in accordance with the principles of the present invention.

Referring initially to FIG. 1, illustrated is a block diagram of an embodiment of a communications network, generally designated 100, employing a router 130 constructed in accordance with the principles of the present invention. The communications network 100 is designed to route network data (data and other information) from one point in the network to another point in the network.

In the illustrated embodiment, the communications network 100 may include a first network 120, a second network 140 and a third network 150. The networks 120, 140, 150, may be any type of communications network and may include a Local Area Network ("LAN"), a Wide Area Network ("WAN"), an Intranet, an Extranet, the Internet, the World Wide Web or a combination thereof. In a preferred embodiment, the networks 120, 140, 150 are packet networks employing Internet Protocol ("IP").

The first network 120 is couplable to a source device 110 and the router 130. The router is also couplable to a first destination device 160 via the second network 140 and to a second destination device 170 via the third network 150. The source device 110, the first destination device 160 and the second destination device 170 may be conventional computer systems capable of sending and receiving network data.

The router 130 routes network data between the networks 120, 140, 150, and may include a field programmable network application specific integrated circuit (ASIC) or a field programmable router ASIC. The field programmable network ASIC and the field programmable router ASIC are discussed in more detail in FIGS. 2 and 3 respectively. In the illustrated embodiment, the source device 110 may send network data to the router 130 via the first network 120. The router 130 may then determine how to route the network data based upon the network data and routing tables. One skilled in the pertinent art is familiar with routing tables and other routing techniques employed to route network data.

In the illustrated example, the router 130 may route a network data received from the source device 110 to the first destination device 160 via the second network 140. The router 130 may also route the network data to the second destination device 170 via the third network 150. Of course, however, the present invention is not limited to routing from the source device 110 and destination devices 160, 170. Other embodiments of the present invention may include any number of source devices, destination devices and routers. Also, the present invention is not limited to routing from a source device to a destination device. In other embodiments, the router 130 may route network data between any device and in any manner.

Figure 2:
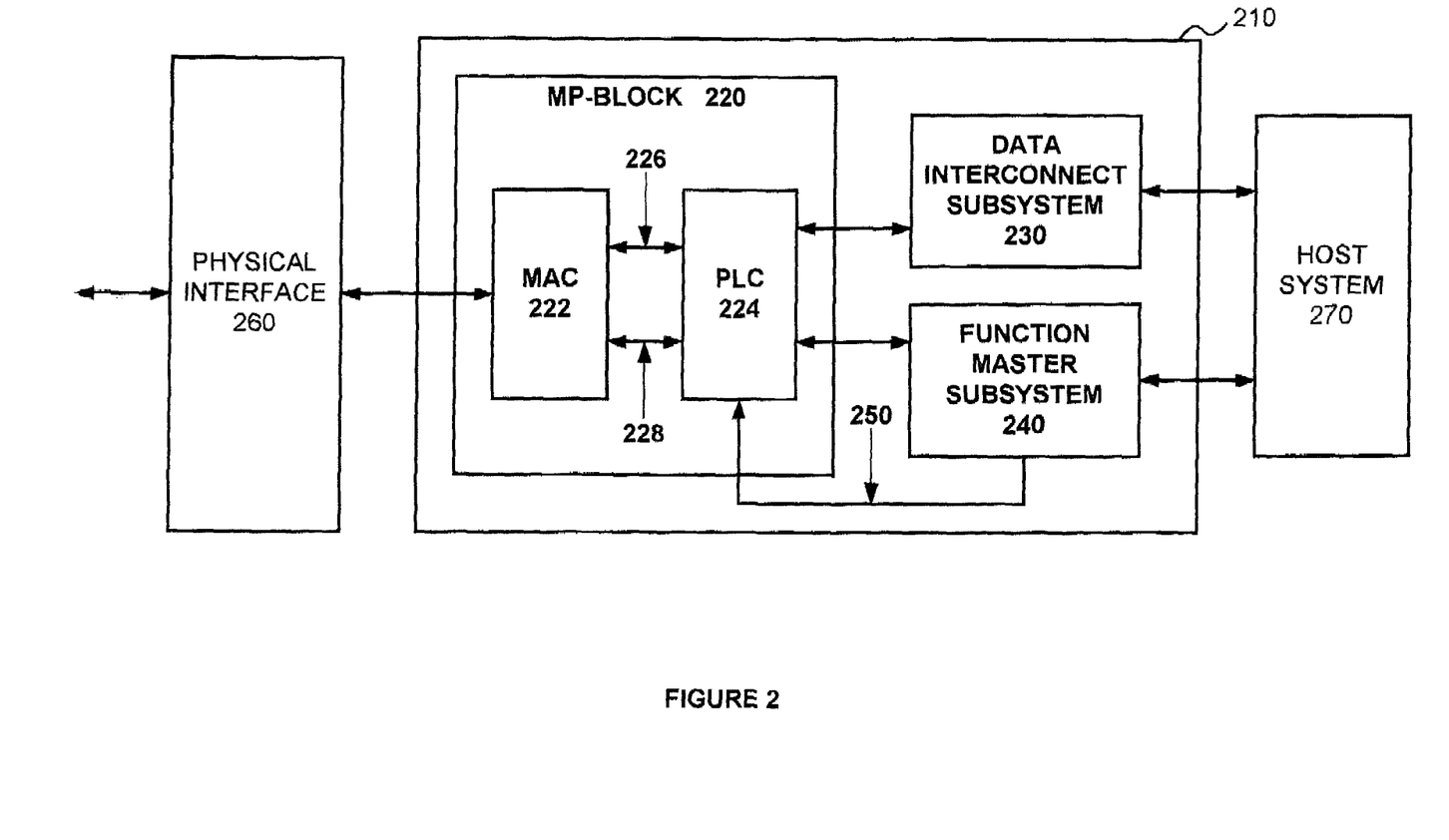
FIG. 2 illustrates a block diagram of an embodiment of a router employing a field programmable network application specific circuit constructed in accordance with the principles of the present invention.

Turning now to FIG. 2, illustrated is a block diagram of an embodiment of a router, generally designated 200, employing a field programmable network application specific circuit (ASIC) 210 constructed in accordance with the principles of the present invention. The field programmable network ASIC 210, in one embodiment, may be employed in the router 130, illustrated in FIG. 1. The field programmable network ASIC 210 provides a new level of silicon-level flexibility that was previously unavailable on an ASIC chip. Additionally, the field programmable network ASIC 210 provides the programmability of traditional field programmable gate array (FPGA) chips with the performance that, until now, only traditional ASIC chip processors could deliver. Likewise, the field programmable network ASIC 210 experiences a reduced time to market and a reduced risk after reaching market, both of which play a vital role in today's competitive market.

In the illustrated embodiment shown in FIG. 2, the field programmable network ASIC 210 includes a MP-block 220 having a media access controller (MAC) 222 and a programmable logic core (PLC) 224. The MAC 222, in one embodiment, is configured to transmit and receive network data from a conventional physical interface 260. The PLC 224 includes an array of dynamically configurable arithmetic logic units and is configured to interface with the MAC and implement at least one application level function capable of generating meta-data. The application level function may be an adaptive pulse code modulation (ADPCM), an Internet Protocol (IP) encryption, an IP decryption, a content based addressing, a network-address translation (NAT), a validation of packets, a protocol packetization and a quality-of-service metrics. Of course, however, the present invention is not limited to the application level functions listed above.

For the purposes of the present invention, the phrase "configured to" means that the device, the system, or the subsystem, includes the necessary software, hardware, firmware or a combination thereof to accomplish the stated task. The phrase "dynamically configurable" with respect to the array of arithmetic logic units means that the array or a portion of the array of arithmetic logic units may be configured (e.g., programmed) while executing a current configuration. The dynamic configurability of the array of arithmetic logic units allows an ASIC that employs the array of arithmetic logic units to execute one configuration (e.g., a set of functions) for a given set of data and reconfigure and execute a new configuration for another set of data. This unique feature provides a degree of programming flexibility that was not previously available in the prior art hardwired ASIC devices.

In one advantageous embodiment, an array of dynamically configurable arithmetic logic units contains an array of 16 (4×4) Hex blocks. A Hex block is generally understood as the smallest geometric region used to build larger arrays. As such, arrays are commonly quoted in terms of Hex blocks, wherein each Hex block contains 16 quad blocks, and each quad block contains 4 register transfer level (RTL) configurable arithmetic logic units.

In the illustrated embodiment, the PLC 224 receives and send network data to the MAC 222 via a data bus 226. The PLC 224 may also include a management interface 228 that is configured to control and manage the MAC 222. The control and management of the MAC 222 may include setting up control registers (not shown) within the MAC 222 to control transmission and reception of network data, and receiving statistical information from the MAC 222 employing other registers.

The MP-block 220 may also be coupled to a data interconnect subsystem 230 and a function master subsystem 240. The data interconnect subsystem 230 may be configured to transmit and receive network data from the MP-block. In a preferred embodiment, the data interconnect subsystem 230 transmits and receives the network data via the PLC 224. The data interconnect subsystem, in one embodiment, may transmit network data to a host system 270 or receive network data from the host system 270. The host system 270 may be a conventional microprocessor associated with the field programmable network ASIC 210 or any conventional computer system capable of processing network data.

The function master subsystem 240 may be configured to receive the meta-data from the MP-block. For the purposes of the present invention, "meta-data" includes any type of data generated by an application level function or any function implemented within a programmable logic core. For example, meta-data may be routing information extracted from an IP message, packet type information, classification information determined from the network data and statistical information. One skilled in the art should know that not all of the functions implemented within a programmable logic core will generate meta-data.

In the illustrated embodiment, the function master subsystem 240 may transmit the meta-data received from the PLC 224 to the host system 270. The function master subsystem 240 may also dynamically program the PLC 224. In one embodiment, the function master subsystem 240 may receive programming instructions for the PLC 224 from the host system. In another embodiment, the function master subsystem 240 may program the PLC 224 based upon the meta-data received by the function master subsystem 240. In yet another embodiment, the function master subsystem 240 may receive the network data and program the PLC 224 based upon content of the network data. Also, the PLC 224, in one embodiment, may be programmed while executing a previously programmed or implemented function. Of course, however, the present invention is not limited to programming the PLC 224 by the methods described above. While the block diagram illustrated in FIG. 2 shows some of the devices that may be included within the field programmable network ASIC 210, it should be noted that other components not shown may be included therein without departing from the scope of the present invention.

Figure 3:
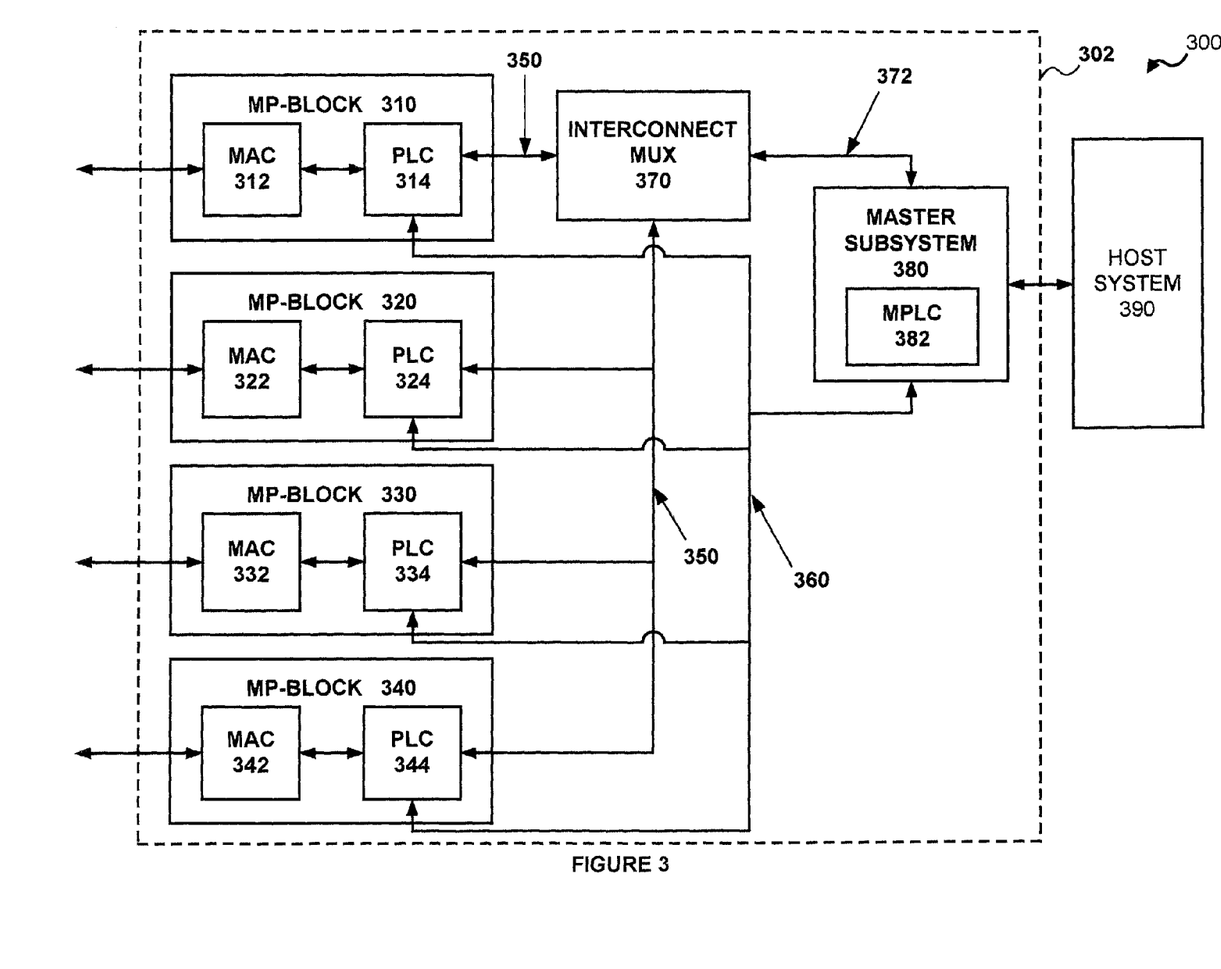
FIG. 3 illustrates a block diagram of an embodiment of a router employing a field programmable router application specific circuit constructed in accordance with the principles of the present invention.

Turning now to FIG. 3, illustrated is a block diagram of an embodiment of a router, generally designated 300, employing a field programmable router application specific circuit (ASIC) 302 constructed in accordance with the principles of the present invention. The field programmable router ASIC 302, in one embodiment, may be employed in the router 130, illustrated in FIG. 1. The field programmable router ASIC 302 provides the programmability of traditional field programmable gate array (FPGA) chips with the performance that, until now, only traditional ASIC chip processors could deliver.

In the illustrated embodiment shown in FIG. 3, the field programmable router ASIC 302 includes multiple MP-blocks 310, 320, 330, 340, each having a media access controller (MAC) 312, 322, 332, 342, and a programmable logic core (PLC) 314, 324, 334, 344 respectively. The MACs 312, 322, 332, 342, in one embodiment, are configured to transmit and receive network data from a conventional physical interface (not shown). The PLCs 314, 324, 334, 344, include an array of dynamically configurable arithmetic logic units and are configured to interface with the MACs 312, 322, 332, 342, and implement at least one application level function capable of generating meta-data. As described previously, the application level function may be an ADPCM, an IP encryption, an IP decryption, a content based addressing, a NAT, a validation of packets, a protocol packetization and a quality-of-service metrics. Of course, however, the present invention is not limited to the application level functions listed above. Nor is the present invention limited to the number of MP-blocks or PCLs illustrated. Other embodiments of the present invention may include any number of MP-blocks or PLCs within each MP-block.

The PLCs 314, 324, 334, 344, perform the implemented application level function or functions on the network data received from or transmitted to the MACs 312, 322, 332, 342. Each of the PLCs 314, 324, 334, 344, may perform different application level functions, the same application level functions or a combination thereof. In the illustrated embodiment, each of the PCLs 314, 324, 334, 344, are coupled to an interconnect MUX 370 via a network data bus 350. The interconnect MUX 370 is also configured to switch the network data between ones of the MP-blocks 310, 320, 330, 340, via the network data bus 350.

The PLCs 314, 324, 334, 344, in one embodiment, are also coupled to a master subsystem 380 via a meta-data bus 360. The master subsystem 380 is configured to receive the meta-data from each of the PLCs 314, 324, 334, 344, and control the interconnect MUX 370, via a control bus 372, to route the network data between ones of the MP-blocks 310, 320, 330, 340. The master subsystem 380 may also include a master programmable logic core (MPLC) 382 having an array of dynamically configurable arithmetic logic units. The MPLC 382 may be configured to receive the meta-data from the MP-blocks 310, 320, 330, 340, and implement at least one router application level function. The router application level functions may include a content based routing, a protocol de-packetization, a protocol stack control and a load balancing. Of course, however, the present invention is not limited to the router application level functions listed above. Other embodiments of the present invention may employ any type of router application level function.

The master subsystem 380 may be further configured to transmit received meta-data or network data to a host system 390. The host system 390 may be a conventional microprocessor associated with the field programmable router ASIC 302 or any conventional computer system capable of processing network data or meta-data. In another embodiment, the master subsystem 380 may be further configured to receive programming instructions from the host system 390 and program the MP-blocks 310, 320, 330, 340. In yet another embodiment, the master subsystem 380 may program the MP-blocks 310, 320, 330, 340, based upon the meta-data or upon the content of the network data. Also, each of the PLCs 314, 324, 334, 344, and the MPLC 382 may be programmed while executing a previously programmed or implemented function.

In one embodiment, the field programmable router ASIC 302 may operate by first receiving network data in the first MP-block 310. The MAC 312 receives the network data and transmits it to its PLC 314. The PLC 314 may then perform an application level function that determines the IP routing information and sends the IP routing information as meta-data to the master subsystem 380. At the same time, the PCL 314 sends the network data to the interconnect MUX 370. The master subsystem 380 employs the MPLC 382 to perform a router application level function, such as content-based routing.

Based upon the meta-data received, the master subsystem 380 may determine to send the network data to the third MP-block 330. However, the device coupled to the third MP-block 330 requires a special protocol conversion. Therefore, the master subsystem 380 may be reprogram the third MP-block's PCL 334 for the special protocol conversion. The master subsystem 380 may then control the interconnect MUX 370 to send the network data to the third MP-block 330. The third MP-block's PLC 334 receives the network data and performs the new protocol conversion on the network data. Once the conversion is completed, the PLC 334 send the converted network data to the MAC 332 for transmission to the device. One skilled in the art should know that this is one example of how the field programmable router ASIC 302 may operate. Other embodiments of the present invention may route network data in any manner and perform other or additional functions.

In the illustrated embodiment, the field programmable router ASIC 302 advantageously allows designers or users to implement all or most of the routing functions within an ASIC. The field programmable router ASIC 302 also allows designers or users to change the functionality of each of the MP-blocks 310, 320, 330, 340, and the master subsystem 380 to meet the requirements of the application, allow for field upgrades, and for protocol changes. The field programmable router ASIC 302 may also convert between different protocols between each of the MP-blocks 310, 320, 330, 340. While the block diagram illustrated in FIG. 3 shows some of the devices that may be included within the field programmable router ASIC 302, it should be noted that other components not shown may be included therein without departing from the scope of the present invention.

Figure 4:
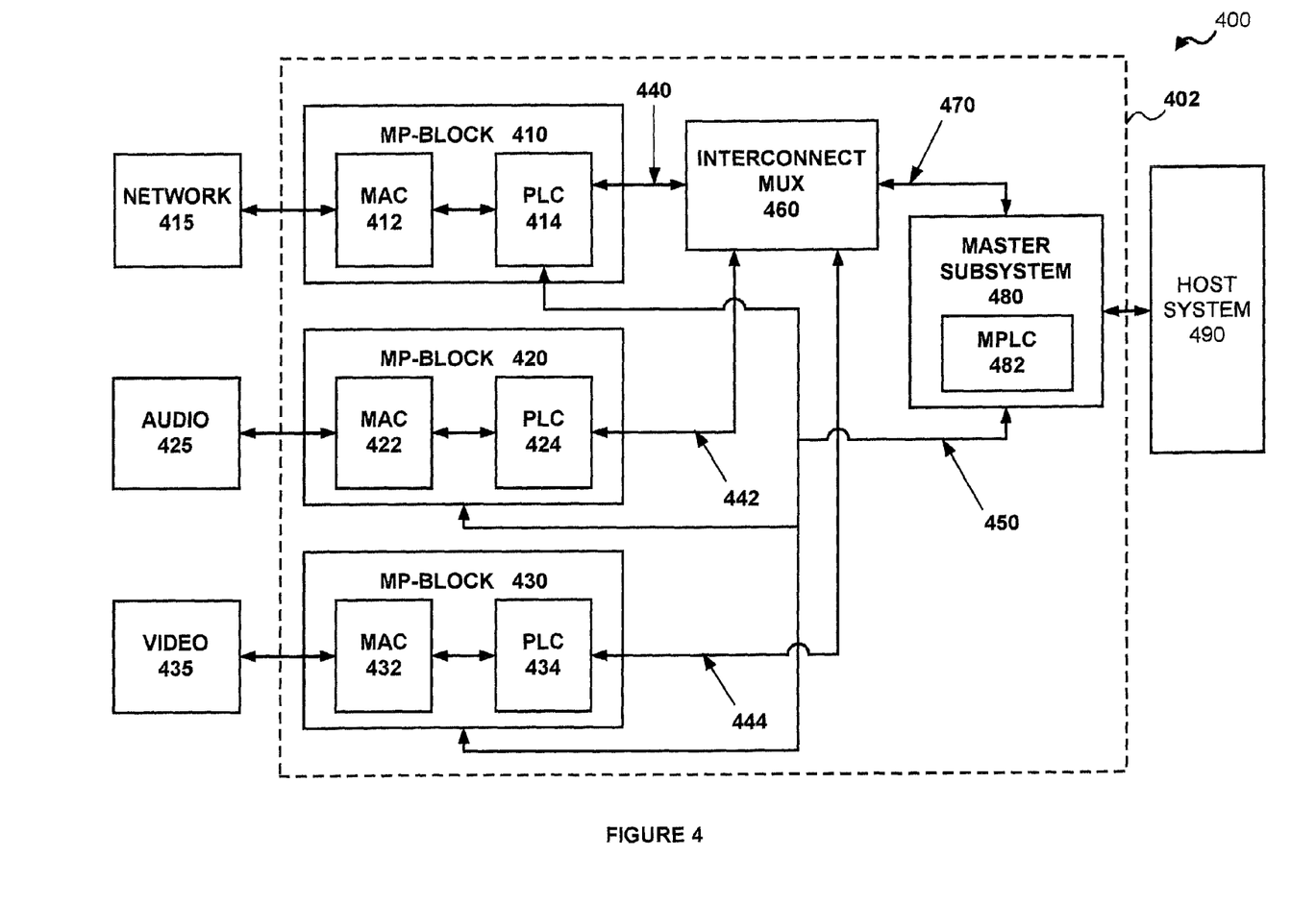
FIG. 4 illustrates a block diagram of an embodiment of a video phone employing a field programmable video phone application specific circuit constructed in accordance with the principles of the present invention.

Turning now to FIG. 4, illustrated is a block diagram of an embodiment of a video phone, generally designated 400, employing a field programmable video phone application specific circuit (ASIC) 402 constructed in accordance with the principles of the present invention. The video phone 400 includes the field programmable video phone ASIC 402 that is similar to the field programmable router ASIC 302 and has the same capabilities and functionality as described in FIG. 3. The field programmable video phone ASIC 402, however, is programmed to perform video phone functions. The video phone 400 also includes a network interface 415, an audio system 425 and a video system 435.

The network interface 415 that is configured to connect to a network, such as a public switched telephone network (PSTN) or a computer network. The audio system 425 includes a speaker (not shown), a microphone (not shown) and other devices, all of which are configured to play and record audio. The video system 435 includes a video display (not shown), a video camera (not shown) and other devices, all of which are configured to display and capture video images.

The field programmable video phone ASIC 402, in one embodiment, includes three MP-blocks 410, 420, 430, each having a media access controller (MAC) 412, 422, 432, and a programmable logic core (PLC) 414, 424, 434, respectively. The MACs 412, 422, 432, in one embodiment, are configured to transmit and receive network data from a physical interface. In the illustrated embodiment, the first MP-block's MAC 412 interfaces with the network interface 415. The second MP-block's MAC 422 interfaces with the audio system 425. The third MP-block's MAC 432 interfaces with the video system 435.

The PLCs 414, 424, 434, include an array of dynamically configurable arithmetic logic units and are configured to interface with the MACs 412, 422, 432, and implement at least one application level function capable of generating meta-data. The PLCs' 414, 424, 434 application level function or functions may be an ADPCM, an encryption/decryption, a video compression/decompression, a NAT, a validation of packets, a protocol packetization and a protocol de-packetization. Of course, however, the present invention is not limited to the application level functions listed above. Nor is the present invention limited to the number of MP-blocks or PCLs illustrated. Other embodiments of the present invention may include any number of MP-blocks or PLCs within each MP-block.

The PLCs 414, 424, 434, perform the implemented application level function or functions on the network data received from or transmitted to the MACs 412, 422, 432. Each of the PLCs 414, 424, 434, 344, may perform different application level functions, the same application level functions or a combination thereof. In the illustrated embodiment, each of the PCLs 414, 424, 434, are coupled to an interconnect MUX 460 via network data buss 440, 442, 444 respectively. The interconnect MUX 460 is also configured to switch the network data between the first MP-block 410, the second MP-block 420 and the third MP-block 430.

The PLCs 414, 424, 434, in one embodiment, are also coupled to a master subsystem 480 via a meta-data bus 450. The master subsystem 480 is configured to receive the meta-data from each of the PLCs 414, 424, 434. The master subsystem 480 is further configured to control the interconnect MUX 460, via a control bus 470, to route the at least a portion of the network data containing audio between the first MP-block 410 and the second MP-block 420. The master subsystem is also configured to control the interconnect MUX 460 to route the at least a portion of the network data containing video between the first MP-block 410 and the third MP-block 430.

The master subsystem 480 may also include a master programmable logic core (MPLC) 482 having an array of dynamically configurable arithmetic logic units. The MPLC 482 may be configured to receive the meta-data from the MP-blocks 410, 420, 430, and implement at least one video phone application level function. The video phone application level functions may include a content based routing, a protocol de-packetization and a H.323 protocol stack control. Of course, however, the present invention is not limited to the video phone application level functions listed above. Other embodiments of the present invention may employ any type of video phone application level function. Also, one skilled in the art is familiar with the H.323 protocol and its applicability to sending and receiving video and audio over a network.

The master subsystem 480 may be further configured to transmit received meta-data or network data to a host system 490. The host system 490 may be a conventional microprocessor associated with the field programmable video phone ASIC 402 or any conventional computer system capable of processing network data or meta-data and couplable to the field programmable video phone ASIC 402. In another embodiment, the master subsystem 480 may be further configured to receive programming instructions from the host system 490 and program the MP-blocks 410, 420, 430. In yet another embodiment, the master subsystem 480 may program the MP-blocks 410, 420, 430, based upon the meta-data or upon the content of the network data. Also, each of the PLCs 414, 424, 434, and the MPLC 482 may be programmed while executing a previously programmed or implemented function.

In the illustrated embodiment, to provide video phone functions, the first MP-block 410 is further configured to split the network data received from the network 415 into an audio portion and a video portion, and sends the portions to the Interconnect MUX 460. The first MP-block 410 also sends meta-data to the master subsystem 480 indicating which portions are audio and which portions are video. The master subsystem 480 controls the interconnect MUX 460 to send the audio portion of the network data to the second MP-block 420. The second MP-block 420 may decompress the audio and send it to the audio system 425. The master subsystem 480 also controls the interconnect MUX 460 to send the video portion of the network data to the third MP-block 430. The third MP-block 430 may decompress the video and send it to the video system 435.

The audio system 425 and the video system 435 may send audio and video back to the second MP-block 420 and third MP-block 430 respectively. The second MP-block 420 and third MP-block 430 may compress their respective data and send the compressed data to the first MP-block 410 via the interconnect MUX 460 under control of the master subsystem 480. The first MP-block 410 may recombine the compressed audio and video into the appropriate network data format and send it to the network interface 415. Of course, however, the present invention is not limited to the process described above. Other embodiments of the present invention may include other or additional functions and procedures.

Figure 5:
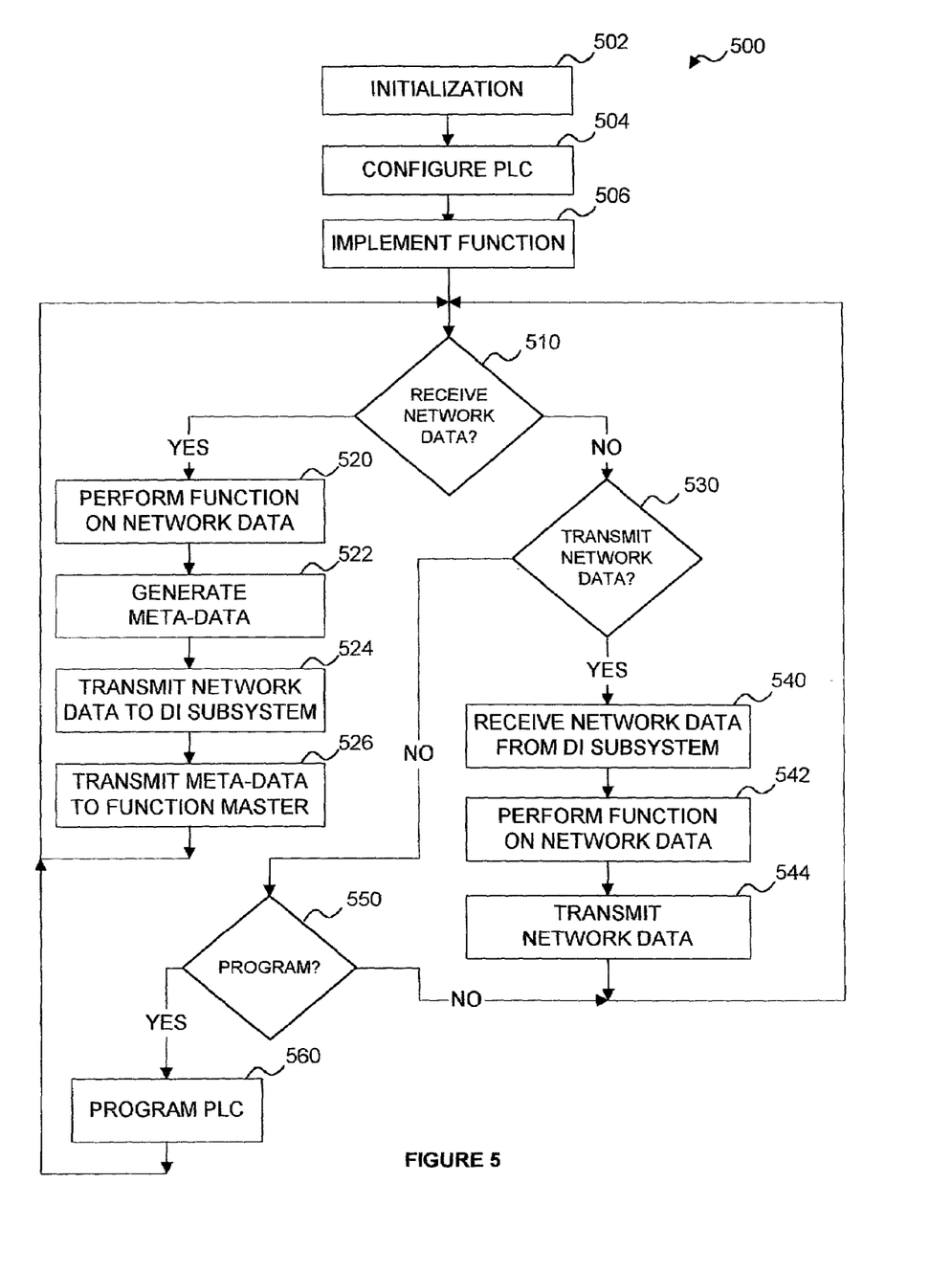
FIG. 5 illustrates a flow diagram of an embodiment of a method of operating a field programmable network application specific circuit constructed in accordance with the principles of the present invention.

Turning now to FIG. 5, illustrated is a flow diagram of an embodiment of a method, generally designated 500, of operating a field programmable network application specific circuit (ASIC) constructed in accordance with the principles of the present invention. In FIG. 5, the field programmable network ASIC first performs initialization in a step 502.

After initialization, the field programmable network ASIC configures a programmable logic core (PLC) to interface with a media access controller (MAC) a step 504. Both the PLC and MAC may be embodied within a MP-block in the field programmable network ASIC. Next, field programmable network ASIC implements at least one application level function capable of generating meta-data in the PLC in a step 506.

The field programmable network ASIC then determines if it has received network data to process in a decisional step 510. In one embodiment, the network data is received from a physical device via the MAC. If the field programmable network ASIC received network data, the field programmable network ASIC performs or executes the implemented application level function on the received network data in a step 520. The field programmable network ASIC then generates meta-data as a function of the application level function in a step 522. In one embodiment, the PLC may generate the meta-data. In another embodiment, the application level function may not generate meta-data.

Next, the field programmable network ASIC employs the PLC to transmit the network data to a data interconnect subsystem in a step 524. In a related embodiment, the data interconnect subsystem may then transmit the network data to a host system coupled to the field programmable network ASIC. The field programmable network ASIC then employs the PLC to transmit the meta-data to a function master subsystem in a step 526. In a related embodiment, the function master subsystem may transmit the meta-data to a host system coupled to the field programmable network ASIC. The field programmable network ASIC then returns to determine if additional network data has been received in the decisional step 510.

If the field programmable network ASIC did not receive network data in the decisional step 510, the field programmable network ASIC then determines if there is network data to transmit to a physical interface device in a decisional step 530. If there is network data to transmit, the PLC of the field programmable network ASIC receives the network data from the data interconnect subsystem in a step 540. The data interconnect subsystem may receive the network data from the host system. The PLC of the field programmable network ASIC then performs at least one application level function on the network data in a step 542. In a related embodiment, the application level function may also generate meta-data used by the function master subsystem. The PLC sends the network data to the MAC and the MAC transmits the network data to the physical interface device in a step 544. The field programmable network ASIC then returns to determine if additional network data has been received in the decisional step 510.

If there is network data to transmit to a physical interface device in the decisional step 530, the field programmable network ASIC then determines if the PLC is to be programmed in a decisional step 550. If the PLC is to be programmed, the PLC is programmed in a step 560. In one embodiment, the PLC may be programmed while the PLC is executing an application level function. In another embodiment, the PLC may be programmed based upon the meta-data generated by an application level function. In yet another embodiment, the PLC may be programmed based upon the content of the network data. The field programmable network ASIC then returns to determine if additional network data has been received in the decisional step 510.

If the PLC is not to be programmed, the field programmable network ASIC then returns to determine if additional network data has been received in the decisional step 510. One skilled in the art should know that the present invention is not limited to the type of processing performed nor the steps described above. Other embodiments of the present invention may have additional or fewer steps than described above.

Although the present invention has been described in detail, those skilled in the art should understand that they can make various changes, substitutions and alterations herein without departing from the spirit and scope of the invention in its broadest form.

What is claimed is:

1. A field programmable router application specific integrated circuit, comprising:
    a plurality of media access controllers and a plurality of programmable logic core blocks (MP-blocks), including:
        at least one media access controller that transmits and receives network data via a physical interface device, and
        at least one programmable logic core having an array of dynamically configurable arithmetic logic units, said programmable logic core interfaces with said media access controller and implements at least one application level function capable of generating meta-data;
        an interconnect multiplexer (MUX) coupled to each of said plurality of MP-blocks and configured to switch said network data between ones of said plurality of MP-blocks; and
    a master subsystem configured to receive said meta-data from each of said plurality of MP-blocks and control said interconnect MUX to route said network data, wherein said master subsystem further includes a master programmable logic core having an array of dynamically configurable arithmetic logic units, said master programmable logic core configured to receive said meta-data and implement at least one router application level function.

2. The field programmable router application specific integrated circuit as recited in claim 1 wherein said programmable logic core may be programmed while said at least one application level function is executing.

3. The field programmable router application specific integrated circuit as recited in claim 1 wherein said master subsystem is further configured to receive programming instructions from a host system.

4. The field programmable router application specific integrated circuit as recited in claim 1 wherein said master subsystem is further configured to transmit said meta-data or network data to a host system.

5. The field programmable router application specific integrated circuit as recited in claim 1 wherein said master subsystem is capable of programming each of said plurality of MP-blocks based upon said meta-data.

6. The field programmable router application specific integrated circuit as recited in claim 1 wherein said master subsystem is capable of programming each of said plurality of MP-blocks based upon content of said network data.

7. The field programmable router application specific integrated circuit as recited in claim 1 wherein said at least one router application level function is selected from the group consisting of:
    a content based routing,
    a protocol de-packetization,
    a protocol stack control, and
    a load balancing.

8. The field programmable router application specific integrated circuit as recited in claim 1 wherein said at least one application level function is selected from the group consisting of:
    an adaptive pulse code modulation (ADPCM),
    an Internet Protocol encryption,
    an Internet Protocol decryption,
    a network-address translation (NAT),
    a validation of packets,
    a protocol packetization, and
    a quality-of-service metrics.

9. The field programmable router application specific integrated circuit as recited in claim 1 wherein said programmable logic core includes a management interface configured to control and manage said media access controller.

10. A field programmable video phone application specific integrated circuit, comprising:
    a first, second and third media access controller and a plurality of, including a first, a second, and a third, programmable logic core blocks (MP blocks), including:
        at least one media access controller that transmits and receives network data via a physical interface device, and
        at least one programmable logic core having an array of dynamically configurable arithmetic logic units, said programmable logic core interfaces with said media access controller and implements at least one application level function capable of generating meta-data;
        an interconnect multiplexer (MUX) coupled to said first, second and third MP-blocks and configured to switch said network data between said first MP-block and said second and third MP-blocks; and
    a master subsystem configured to receive said meta-data, control said interconnect MUX to route at least a portion of said network data containing audio between said first MP-block and said second MP-block, and control said interconnect MUX to route at least a portion of said network data containing video between said first MP-block and said third MP-block, wherein said first MP-block is further configured to split said network data into an audio portion and a video portion, and recombine said audio portion and video portion.

11. The field programmable video phone application specific integrated circuit as recited in claim 10 wherein said second MP-block is further configured to compress and decompress audio.

12. The field programmable video phone application specific integrated circuit as recited in claim 10 wherein said third MP-block is further configured to compress and decompress video.

13. The field programmable video phone application specific integrated circuit as recited in claim 10 wherein said programmable logic core may be programmed while said at least one application level function is executing.

14. A field programmable video phone application specific integrated circuit, comprising:
    a first, second and third media access controller and a plurality of, including a first, a second, and a third, programmable logic core blocks (MP blocks), including:
        at least one media access controller that transmits and receives network data via a physical interface device, and
        at least one programmable logic core having an array of dynamically configurable arithmetic logic units, said programmable logic core interfaces with said media access controller and implements at least one application level function capable of generating meta-data;
an interconnect multiplexer (MUX) coupled to said first, second and third MP-blocks and configured to switch said network data between said first MP-block and said second and third MP-blocks; and
a master subsystem configured to receive said meta-data, control said interconnect MUX to route at least a portion of said network data containing audio between said first MP-block and said second MP-block, and control said interconnect MUX to route at least a portion of said network data containing video between said first MP-block and said third MP-block, wherein said master subsystem further includes a master programmable logic core having an array of dynamically configurable arithmetic logic units, said master programmable logic core receives said meta-data and implements at least one video phone application level function.

15. The field programmable video phone application specific integrated circuit as recited in claim 10 wherein said master subsystem is further configured to receive programming instructions from a host system.

16. The field programmable video phone application specific integrated circuit as recited in claim 10 wherein said master subsystem is further configured to transmit said meta-data or network data to a host system.

17. The field programmable video phone application specific integrated circuit as recited in claim 10 wherein said master subsystem is capable of programming each of said first, second and third MP-blocks based upon said meta-data or upon content of said network data.

18. The field programmable video phone application specific integrated circuit as recited in claim 10 wherein said at least one video phone application level function is selected from the group consisting of:
 a content based routing,
 a protocol de-packetization, and
 a H.323 protocol stack control.

19. The field programmable video phone application specific integrated circuit as recited in claim 10 wherein said at least one application level function is selected from the group consisting of:
 an adaptive pulse code modulation (ADPCM),
 an encryption/decryption,
 a video compression/decompression,
 a network-address translation (NAT),
 a validation of packets,
 a protocol packetization, and
 a protocol de-packetization.

20. The field programmable video phone application specific integrated circuit as recited in claim 10 wherein said programmable logic core includes a management interface configured to control and manage said media access controller.

* * * * *